United States Patent [19]
Katsuta et al.

[11] Patent Number: 5,232,729
[45] Date of Patent: Aug. 3, 1993

[54] WHEY PROTEIN GEL AND A PROCESS FOR PRODUCING THE SAME

[75] Inventors: Keiko Katsuta, Niigatashi; Jun Hiraki, Yokohamashi, both of Japan

[73] Assignee: Chisso Corporation, Osaka, Japan

[21] Appl. No.: 834,215

[22] Filed: Feb. 12, 1992

[30] Foreign Application Priority Data

Feb. 28, 1991 [JP] Japan .................................. 3-57769

[51] Int. Cl.$^5$ .......................................... A23L 1/0562
[52] U.S. Cl. .................................. 426/573; 426/583
[58] Field of Search ............... 426/573, 574, 614, 657, 426/802, 583

[56] References Cited

U.S. PATENT DOCUMENTS

| | | | |
|---|---|---|---|
| 4,364,966 | 12/1982 | Chang | 426/614 |
| 4,460,615 | 7/1984 | Furukada et al. | 426/614 |

FOREIGN PATENT DOCUMENTS

2052515 1/1991 United Kingdom.

OTHER PUBLICATIONS

Patent Abstract of Japan; vol. 7, No. 268 (C-197) Nov. 30, 1983 of JP-A-58 149 645; Sep. 6, 1983.

Katsuta et al. "Spontaneous Gelatin of Whey Proteins in Urea and Guanidine Hydrochloride", Agric. Biol. Chem., 54, 2423-2424, 1990.

Katsuta et al., "Viscoelastic Properties of Whey Protein Gels: Mechanical Model and Effects of Protein Concentration on Creep", J. Food Sci., 55, 516-521, 1990.

*Primary Examiner*—Jeanette Hunter
*Attorney, Agent, or Firm*—Leydig, Voit & Mayer

[57] ABSTRACT

A whey protein gel which is transparent, thermostable, usable as food and is highly safe without damaging the nutritive value of whey protein, and a process for producing the gel are provided, which gel comprises whey protein dissolved or dispersed in water or a buffer solution and poly-L-lysine or its salt, and which process comprises adding poly-L-lysine or its salt to a solution or dispersion of whey protein in water or a buffer solution to effect gelation.

8 Claims, No Drawings

WHEY PROTEIN GEL AND A PROCESS FOR PRODUCING THE SAME

BACKGROUND OF THE INVENTION

1. Field of the Invention

This invention relates to a whey protein gel comprising whey protein dissolved or dispersed in water or a buffer solution and poly-L-lysine or its salt, and a process for producing the gel. The whey protein gel may be used as a whey protein-containing jelly and a jelly-like beverage, and further may be preferably used as a binder, a stabilizer or a bulking filler for meats or may be used for preparing sausage, hamburger, meats for steak, "Kamaboko" (a Japanese term; a kind of boiled fish paste), etc.

2. Description of the Related Art

Whey protein is obtained as a byproduct in the production of cheese and casein, and it has been known to be a protein having a high nutritive value. However, a method of effectively utilizing the whey protein has not yet been established. Further, it has been known that when whey protein is heated and then cooled, it gels in the form of a denatured gel, like other proteins. However, such a denatured gel obtained by heating the whey protein has a defect that it is unstable to heat, for example, when it is heated to 100° C. or higher, the gel is destroyed.

As an attempt to obtain a thermostable whey protein gel, urea or guanidine hydrochloride has been added to whey protein. However, it is impossible to use urea and guanidine hydrochloride for foods; hence whey protein gel produced in the presence of urea or guanidine hydrochloride are stable to heat, but have a serious defect in that they cannot be utilized for foods.

The present inventors have made extensive research in obtaining a whey protein gel having high safety as foods and also a high thermostability, unlike conventional whey protein gels made by using urea or guanidine hydrochloride. As a result, we have found that when poly-L-lysine is added to a whey protein solution or dispersion dissolved or dispersed in water or a buffer solution, it is possible to prepare a transparent and thermostable gel at room temperature, unlike gels obtained by thermally denaturing proteins. Further, we have found that when the gel obtained by adding poly-L-lysine to whey protein is heated, the resulting gel is firmer and/or more rigid. Thus it is possible to apply the process of the present invention together with known gelation process by heating whey protein. Thus, the present invention has been completed.

SUMMARY OF THE INVENTION

As apparent from the foregoing, the object of the present invention is to provide a whey protein gel which is transparent, thermostable, usable as food and highly safe, without damaging the nutritive value of whey protein, and a process for producing the gel.

The present invention resides in:

(1) A whey protein gel comprising whey protein dissolved or dispersed in water or a buffer solution and a poly-L-lysine or its salt.

(2) A whey protein gel according to item (1), comprising a solution or dispersion of 8 to 70% by weight of whey protein and 0.01 to 1 part by weight of poly-L-lysine or its salt based upon one part by weight of whey protein.

(3) A whey protein gel according to item (1), wherein said poly-L-lysine or its salt is selected from the group consisting of $\alpha$-poly-L-lysine, its salt, $\epsilon$-poly-L-lysine and its salt.

(4) A whey protein gel according to item (2), wherein said poly-L-lysine or its salt is selected from the group consisting of $\alpha$-poly-L-lysine, its salt, $\epsilon$-poly-L-lysine and its salt.

(5) A whey protein gel according to item (1), wherein said salt of poly-L-lysine is an inorganic salt or an organic salt.

(6) A whey protein gel according to item (2), wherein said salt of poly-L-lysine is an inorganic salt or an organic salt.

(7) A process for producing a whey protein gel comprising adding poly-L-lysine or its salt to a solution or dispersion obtained by dissolving or dispersing a whey protein in water or a buffer solution to effect gelation.

(8) A process for producing a whey protein gel according to item (7), comprising adding to a whey protein solution or dispersion containing 8 to 70% by weight of whey protein, 0.01 to 1 part by weight of poly-L-lysine or its salt based upon one part by weight of whey protein.

DETAILED DESCRIPTION OF PREFERRED EMBODIMENTS

As a poly-L-lysine used in the present invention, either of $\alpha$-poly-L-lysine having an amino group at the $\alpha$-position linked to a carboxyl group or $\epsilon$-poly-L-lysine having an amino group at the $\epsilon$-position linked to carboxyl group may be used. Further, not only free poly-L-lysine, but also salts thereof with an inorganic acid such as hydrochloric acid, sulfuric acid, hydrobromic acid, phosphoric acid, etc. or an organic acid such as propionic acid, fumaric acid, malic acid, citric acid, etc. may be used. Further, the whey protein used in the present invention may be obtained as follows:

Milk is centrifuged into skim milk, followed by adding hydrochloric acid or a mixed solution of hydrochloric acid with lactic acid or acetic acid to the skim milk to adjust the pH to 4.5, subjecting the resulting mixture to centrifugal separation and precipitating and separating the resulting casein. The resulting supernatant contains the whey protein. At present, an isolated whey protein containing 90% by weight or more of protein has come to be obtained by concentrating the above supernatant by ultrafiltration and ion-exchange method.

As the whey protein used in the present invention, either a crude product or purified product may be used.

The amount of poly-L-lysine added when the whey protein gel of the present invention is prepared, is 0.01 to 1 part by weight of poly-L-lysine based upon one part by weight of whey protein. Further, the content of whey protein in the dispersion or the solution is preferred to be relatively high, and usually it may be 8% by weight or higher, preferably 15% by weight or higher. As to the reaction conditions of gelation, pH is 5–9, the reaction temperature is 4° to 80° C., preferably 4° to 70° C. and while the reaction time varies depending upon the pH and temperature in the reaction, the dispersion or solution may be allowed to stand for 6 to 24 hours.

While the gel of the present invention is preferred to have a dynamic storage modulus (log G') of 2 or more, it is possible to optionally adjust the gel elasticity depending upon the reaction conditions. Further, by allowing the prepared gel to stand at a low temperature of about 4° C., it is possible to get a gel having a higher gel modulus. Further, due to the low temperature reaction, the resulting gel is not opaque, but transparent, and even if this gel is heated to 100° C. or higher, it is stable. Thus, it is possible to add other protein, oil and fat, perfume, etc. to the gel in accordance with the respective objects. Further, due to its hygienic safety for foods, it is possible to use it as a food stock in various use applications.

EXAMPLES

The present invention will be described below in more detail by way of Examples. "%" therein means "% by weight".

EXAMPLE 1

Whey protein was dispersed in distilled water to make a 20% by weight dispersion, followed by adding to this dispersion, $\epsilon$-poly-L-lysine so as to give proportions of 0.1, 0.2, 0.5 and 1.0 part by weight based on one part by weight of whey protein, agitating the mixture, and allowing it to stand at 25° C. for 24 hours. The resulting gel is poured in a glass tube after gelation was observed by the naked eye, followed by cutting it into a cylindrical block ($\phi 11 \times 10$ mm), and measuring its dynamic storage modulus (log G') and its dynamic loss modulus (log G") by means of a dynamic modulus-measuring apparatus (MR-300 type made by Rheology Co., Ltd.). The results are shown in Table 1. Further, any of the formed gels were visually transparent.

TABLE 1

| Whey protein: poly-L-lysine | log G' | log G" |
| --- | --- | --- |
| 1:0.1 | 2.1 | 2.0 |
| 1:0.2 | 2.4 | 2.2 |
| 1:0.5 | 3.1 | 2.8 |
| 1:1 | 4.7 | 4.3 |

As apparent from the above results, the gel of the present invention was obtained by gelation at 25° C. without any thermal denaturation of the protein. Further, in view of the log G' and log G" values, it is confirmed that the gel has a characteristic of a high viscosity.

EXAMPLE 2

Whey protein was dissolved in distilled water so as to give concentrations of 8%, 15%, 50% and 70% by weight, followed by adding to the resulting solutions or dispersions (10 g), $\epsilon$-poly-L-lysine so as to give a proportion of 0.5 part by weight based upon one part by weight of whey protein, agitating the mixture, allowing it to stand at 25° C. for 24 hours, visually confirming gelation and measuring the log G' and log G" of the resulting gels in the same manner as in Example 1. The results are shown in Table 2.

TABLE 2

| Concentration of whey protein solution (%) | log G' | log G" |
| --- | --- | --- |
| 8.0 | 2.1 | 2.0 |
| 15.0 | 2.8 | 2.6 |
| 50.0 | 4.8 | 4.4 |
| 70.0 | 5.5 | 5.0 |

EXAMPLE 3

Whey protein was dispersed in distilled water so as to give a concentration of 20% by weight, followed by adding to the resulting dispersion (10 g), $\epsilon$-poly-L-lysine so as to give a proportion of 0.01 part by weight based upon one part by weight of whey protein, agitating the mixture, allowing it to stand at 60° C. for 6 hours, further allowing it to stand at 4° C. for 18 hours, visually confirming gelation, and measuring the log G' and log G" of the gel in the same manner as in Example 1. The results were log G'=2.2 and log G"=2.0.

EXAMPLE 4

Whey protein was dispersed in distilled water so as to give a concentration of 20% by weight, followed by adding to the resulting dispersion (10 g), $\epsilon$-poly-L-lysine so as to give a proportion of 0.5 part by weight based upon one part by weight of whey protein, agitating the mixture, allowing it to stand at 25° C. for 8 hours, further allowing it to stand at 4° C. for 16 hours, still further allowing to stand at 70° C. for 2 hours, and measuring the respective log G's and log G"s of the gels allowed to stand at 4° C. and at 70° C., in the same manner as in Example 1. The results are shown in Table 3.

TABLE 3

| Conditions | log G' | log G" |
| --- | --- | --- |
| at 4° C., after 16 hours | 3.6 | 3.0 |
| at 70° C., after 2 hours | 3.8 | 2.9 |

As apparent from the results, the gel-form composition of the present invention is stable to heat.

EXAMPLE 5

Whey protein was dispersed in tris buffer solution so as to give a concentration of 20% by weight, followed by adding to the resulting dispersion (10 g), $\epsilon$-poly-L-lysine·hydrochloride so as to give a proportion of 0.5 part by weight based upon one weight of whey protein, adding a NaOH aqueous solution to adjust the pH to about 7, agitating the mixture, allowing it to stand at 25° C. for 24 hours and measuring the log G' and log G" of the resulting gel in the same manner as in Example 1. The results were log G'=3.0 and log G"=2.7.

EXAMPLE 6

To a dispersion (10 g) obtained by dispersing whey protein in tris buffer solution so as to give a concentration of 20% by weight of whey protein, was added $\alpha$-poly-L-lysine·hydrobromide so as to give a proportion of 0.5 part by weight based upon one part by weight of whey protein, followed by adding a NaOH aqueous solution to adjust the pH to about 7, agitating the mixture, allowing it to stand at 25° C. for 24 hours and measuring the log G' and log G" of the resulting gel in the same manner as in Example 1. The results were log G'=3.4 and log G"=2.9.

Effectiveness of the Invention

The gel of the present invention can be prepared under mild conditions without relying on thermal denaturation of protein; hence the composition is not damaged in the characteristics of whey protein, thermostable and transparent. Further, the gel is composed only of a substance having a high hygienic stability as foods; hence the composition is preferably usable as a foodstuff suitable for food processing in various use applications.

What we claim is:

1. A whey protein gel comprising whey protein dissolved or dispersed in water or a buffer solution and a poly-L-lysine or its salt.

2. A whey protein gel according to claim 1, comprising a solution or dispersion including 8 to 70% by weight of whey protein and 0.01 to 1 part by weight of poly-L-lysine or its salt based upon one part by weight of whey protein.

3. A whey protein gel according to claim 1, wherein said poly-L-lysine or its salt is selected from the group consisting of α-poly-L-lysine, its salt, ε-poly-L-lysine and its salt.

4. A whey protein gel according to claim 2, wherein said poly-L-lysine or its salt is selected from the group consisting of α-poly-L-lysine, its salt, ε-poly-L-lysine and its salt.

5. A whey protein gel according to claim 1, wherein said salt of poly-L-lysine is an inorganic salt or an organic salt.

6. A whey protein gel according to claim 2, wherein said salt of poly-L-lysine is an inorganic salt or an organic salt.

7. A process for producing a whey protein gel comprising adding poly-L-lysine or its salt to a solution or dispersion obtained by dissolving or dispersing a whey protein in water or a buffer solution to effect gelation.

8. A process for producing a whey protein gel according to claim 7, comprising adding to a whey protein solution or dispersion containing 8 to 70% by weight of whey protein, 0.01 to 1 part by weight of poly-L-lysine or its salt based upon one part by weight of whey protein.

* * * * *